United States Patent [19]

Gilbey

[11] 3,953,550

[45] Apr. 27, 1976

[54] APPARATUS FOR AERATING LIQUIDS

[75] Inventor: Guy Hugh Gilbey, Empingham, England

[73] Assignee: Sodastream Limited, Peterborough, England

[22] Filed: Dec. 18, 1974

[21] Appl. No.: 533,871

[30] Foreign Application Priority Data

Apr. 24, 1974 United Kingdom............... 17834/74

[52] U.S. Cl.............................. 261/64 R; 261/65; 261/DIG. 7; 222/397

[51] Int. Cl.².......................................... C02D 1/00

[58] Field of Search............. 222/129.1, 129.2, 165, 222/325, 396, 397, 399; 261/DIG. 7, 65, 64 R

[56] References Cited
UNITED STATES PATENTS

| | | | |
|---|---|---|---|
| 2,191,918 | 2/1940 | Stadtfeld | 222/165 X |
| 2,805,846 | 9/1957 | Dewan | 261/DIG. 7 |
| 3,105,616 | 10/1963 | Krup | 222/129.2 |
| 3,679,104 | 7/1972 | Giroud | 222/396 |

FOREIGN PATENTS OR APPLICATIONS 34,538  7/1910  Sweden.......................... 261/DIG. 7

*Primary Examiner*—Robert B. Reeves
*Assistant Examiner*—Francis J. Bartuska
*Attorney, Agent, or Firm*—Hans Berman

[57] ABSTRACT

Apparatus for preparing carbonated beverages has a main body providing a receptacle for a $CO_2$ cylinder and a hingedly mounted aerating head carrying a tube connected with the cylinder through a manually operated valve and a cylindrical shield coaxial with the tube for receiving a bottle containing the liquid to be carbonated. The shield is accessible for insertion or removal of a bottle only when swung away from the main body. In the operative position of the aerating head, a platform on the main body can be raised by a lever-operated cam to press the neck of the received bottle against a resilient nozzle on the aerating head. A safety valve linked with the cam releases excess pressure in the charged bottle when the platform is lowered.

7 Claims, 4 Drawing Figures

FIG.2.

APPARATUS FOR AERATING LIQUIDS

The present invention relates to apparatus for aerating liquids and more particularly to apparatus which can be connected to a cylinder containing CO2 whereby water, still wines, milk and soft drinks of all kinds can be aerated.

At present it is normally customary to provide the gas in what can be termed "commercial" types of cylinders which are large and bulky and not easy to handle.

One object of the invention is to provide a portable free standing or wall mounted aerating apparatus which is inexpensive to construct and simple to operate which can be used in the home and small establishments in combination with a comparatively small cylinder for the gas having an outlet valve which can be readily connected to a gas cylinder holder of the apparatus and actuated by means provided on the latter.

A further object of the invention is to ensure that any excess pressure within a bottle or other vessel containing a liquid to be aerated is automatically released through a safety valve before it is possible to remove said bottle or other vessel from the apparatus.

A still further object of the invention is the provision of means for actuating said safety valve as a precautionary measure prior to an aerating operation being effected so as to free the valve from a minor jam before pressure is applied.

Broadly, according to the present invention, there is provided apparatus for aerating liquids comprising a main body part comprising a holder for a gas cylinder, means for actuating a valve on said cylinder for releasing said gas and conveying same to the interior of a bottle or other vessel containing the liquid to be aerated, an aerating head displaceably connected to said body and movable away from said body part to a position in which a bottle can only be inserted therein and subsequently removed therefrom after an aerating operation, said body part having a platform or like support for a bottle and which platform is raisable, after the aerating head with a bottle inserted therein has been moved back towards said body part, to engage the neck of the bottle with a connection associated with the means through which the gas is conveyed, means for actuating a cam for raising and lowering said platform, said cam being formed with, or having associated therewith, a subsidiary cam for actuating a safety valve during raising of the platform and prior to an operating operation to free said valve from a minor jam before gas pressure is applied, the said subsidiary cam, when the operating means for lowering the platform to a position in which the aerating head can be moved away from the main body part, actuating said safety valve on its return movement to release excess gas pressure in the bottle before movement of the aerating head away from the main body part can be effected to facilitate removal of the bottle.

Preferably, the means for turning the platform-actuating cam and the subsidiary cam for actuating the safety valve is a manually swingable lever.

If desired released excess pressure of said gas may be utilised for returning said lever ready for a subsequent operation.

According to a modification, operation of the machine can be effected through suitable mechanism by using the gas cylinder as a power source.

To enable the invention to be clearly understood a preferred embodiment thereof will now be described by way of example with reference to the accompanying drawings, wherein:

FIGS. 3 and 4 illustrate details of construction.

Figure 1:
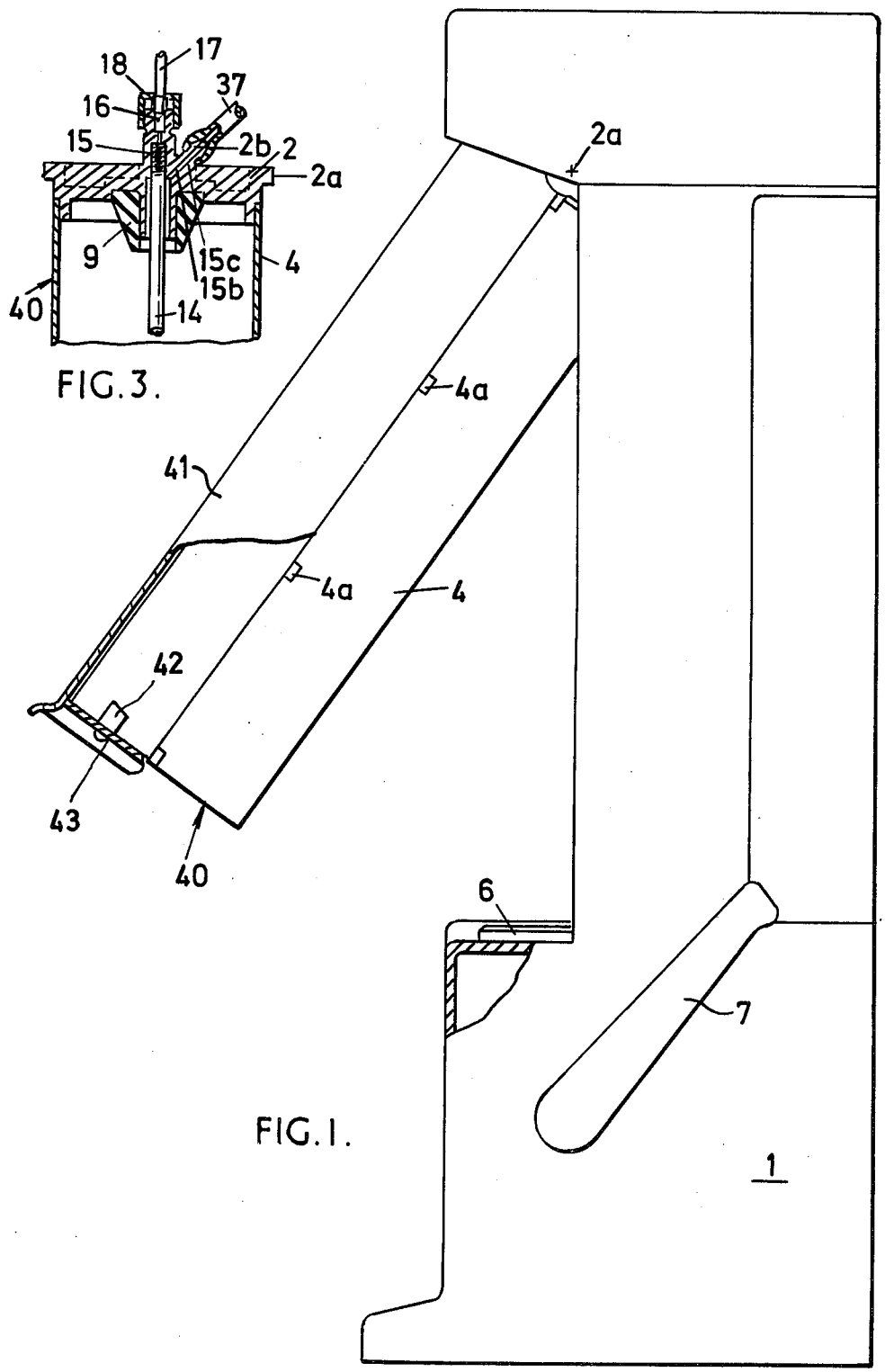
FIG. 1 is a part sectional side elevation of the apparatus.

Referring to said drawings the apparatus comprises a main body 1 into which the components are fitted and which is fitted with an aerating head 2 hinged at 2a so as to be capable of being swung outwardly from the body 1 to enable a bottle 5 containing liquid to be aerated to be inserted in said head and when the head is swung back rested on a platform 6. A tube 4 in which a bottle 5 is contained and shielded is held in position by a front cover 41 which is attached to the aerating head 2 by screws 3 and by a clip 42 which is screwed to the front cover 41 at 43. This clip protrudes into the shield tube 4 and fixes it. This cover 41 clips on to the shield tube 4 at 4a.

The aerating head 2 is lined with the shield or tube 4 to protect users against injury in the event of a damaged bottle or other vessel containing the liquid to be aerated bursting or breaking when the shield 4 which is attached to the head 2 is swung back into position above the platform 6.

Figure 2:
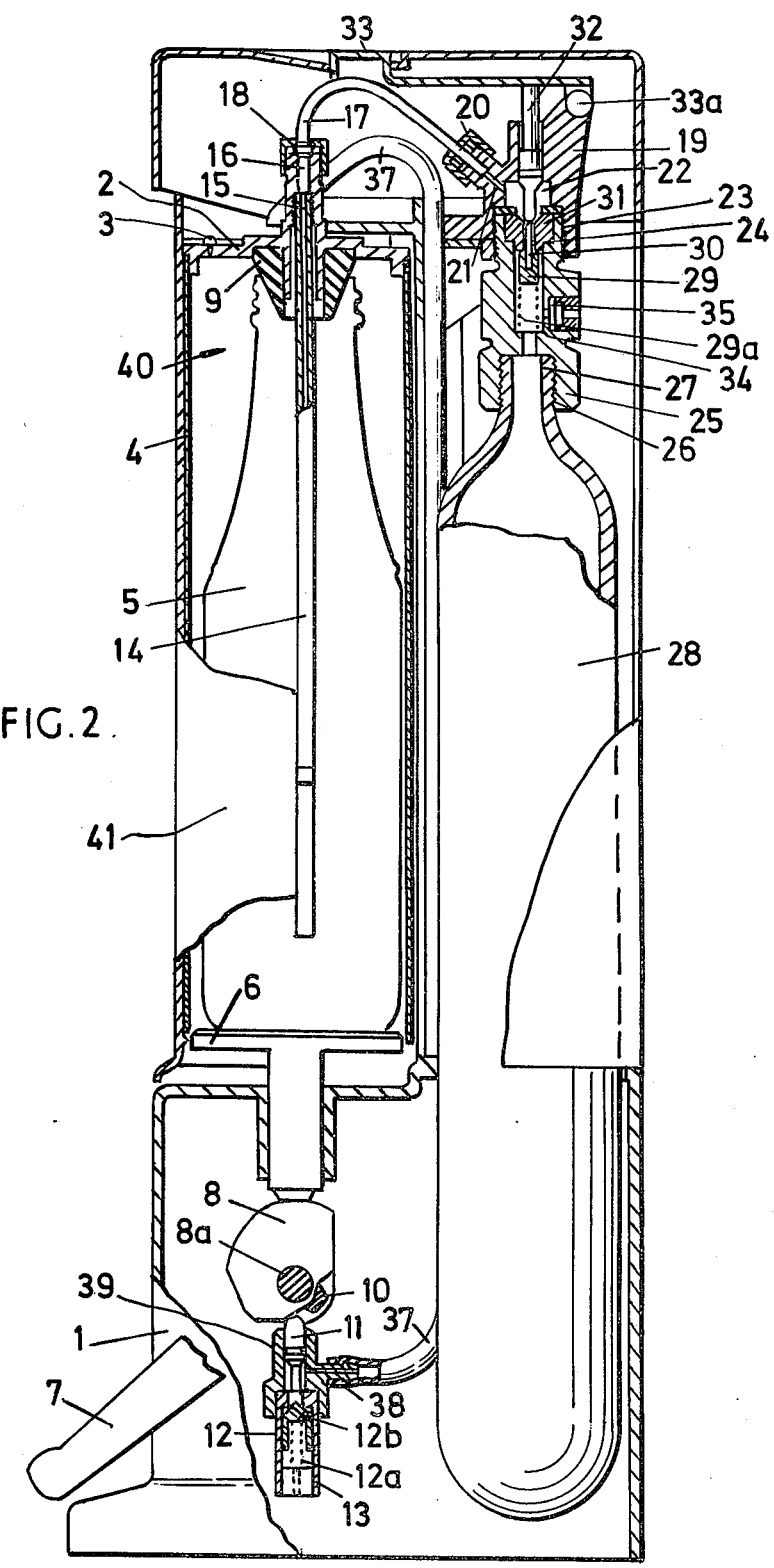
FIG. 2 is a sectional side view.
Figure 4:
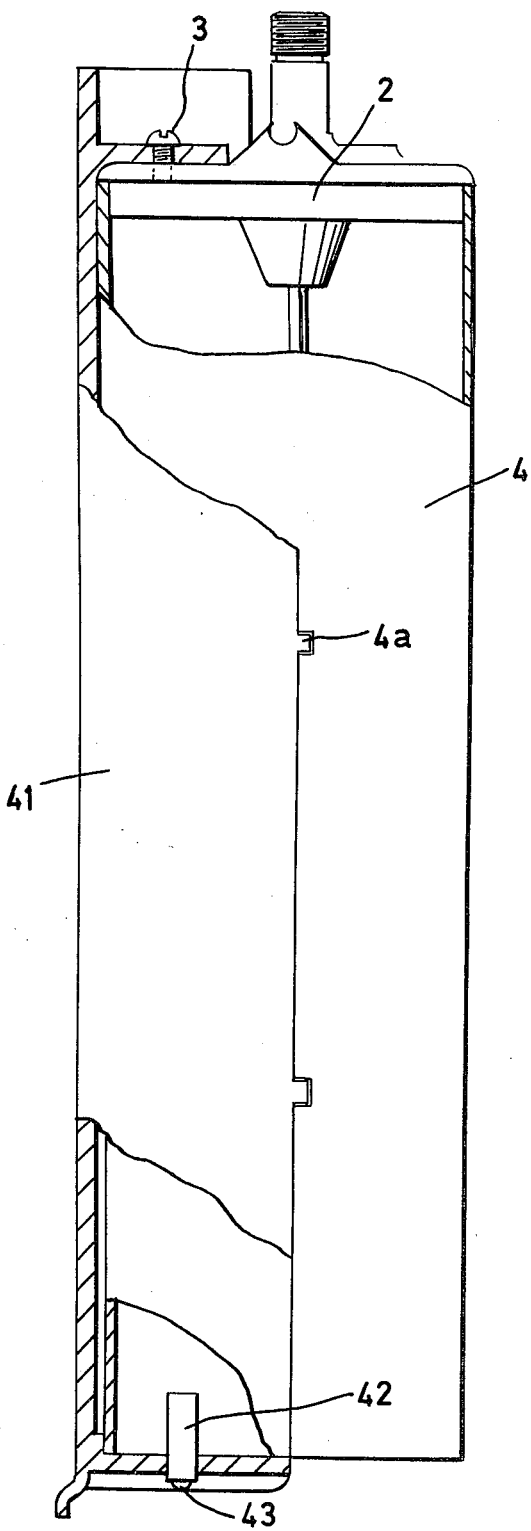

This platform 6 is adapted to be raised from a lower position indicated in FIG. 1 to a raised position indicated in FIG. 2 so as to engage the open top end of the neck of the bottle 5 against a rubber nozzle 9 in a fluid-tight manner.

The raising of the platform 6 and the bottle supported thereby is effected by a cam 8 mounted on a spindle 8a being turned by depressing a lever 7 from the position indicated in FIG. 1 to that indicated in FIG. 2. The bottle 5 cannot be removed from the aerating chamber 40 in the tube 4 without first operating the lever 7 to lower the platform. The said cam 8 is provided with a smaller subsidiary cam 10 which, when the lever 7 is swung down engages and depresses the plunger 11 of a safety valve 13. This depression of the plunger 11 displaces a piston 12 of a valve 13 downwardly against the restraint of the coiled compression spring 12a thereby ensuring that the piston 12 has not become stuck to its seating.

The aerating head 2 accommodates a tube 14 which extends through the rubber nozzle 9 against which the mouth of the neck of the bottle 5 is engaged, the tube extending down inside the bottle 5 and terminating adjacent to the lower end thereof.

The upper end of this tube 14 is threaded at 15 into the aerating head 2 and communicates with a passage or bore 16 which is connected to a flexible tube 17 by a connection 18. The tube 17 is connected to a gas cylinder holder 19 by a connector 20 which opens into the bore 21 of said connector and thence into the bore 22 of the holder 19.

The cylinder holder 19 is threaded internally at 23 to receive an externally threaded boss 24 of a valve body 25 which is adapted to be screwed at 26 on to the neck 27 of a gas cylinder 28 which is small in comparison with the normal tube of a commercial gas cylinder so that it can be easily handled and thereby rendered suitable for use in the home and other small establishments.

The valve body 25 is fitted with a member comprising a seating 29 attached to a pin 30, the said seating 29 engaging against a seating at the lower end of an insert 31 which is formed with a bore through which the pin 30 passes.

The cylinder holder 19 is fitted with a plunger 32 which can be depressed by an external manually operated swingable finger-actuated lever 33, pivoted at 33a to move the parts 29 and 30 of the valve mechanism away from said seating against the influence of a coiled compression spring 29a so as to permit gas to enter the bore 22 in said holder and to pass through the flexible tube 17 and thence into the tube 14 which extends downwardly in the bottle 5 containing the liquid to be aerated. When the lever 33 is released the spring 29a reasserts itself to close the valve 29 and also move the plunger 32 upwardly, the latter being freely slidable in said cylinder holder 19. The valve body is provided with a subsidiary safety device, a blow-out disc 35 which acts to release excess pressure in the gas cylinder 28.

The arrangement is such that gas cylinders 28 are supplied fitted with the valve 25 so that a used cylinder 28 can be removed from the cylinder holder 19 and a fully charged cylinder fitted in place thereof.

The aerating head 2 is provided with a tube 37 which communicates by way of an inlet opening at 2b FIG. 3 with a bore 15c in the aerating head 2 at 15b. The lower end of this tube 37 is attached at 38 to a carrier 39 of the safety valve 13 and in the event of there being an excess pressure of gas in the bottle 5, this will be released through the tube 37 and will pass from the lower end thereof into said safety valve 13 and will displace the piston 12 against the influence of said spring 12a and allow excess gas to pass to the atmosphere. In any event the build up of pressure is released when the handle 7 is swung upwardly and the small cam 10 depresses the plunger 11. The said piston 12 is formed with a small bleed hole 12b through which excess gas can slowly be released.

From the foregoing it will be appreciated that release of any excess pressure is definitely ensured and effected before the platform 6 is lowered sufficiently to permit the aerating head 2 to be swung outwardly and the bottle 5 with the aerated contents thereof withdrawn from said aerating head 2.

A bottle 5 is kept in the chamber 40 of the head 2 by a user placing his hand under the open bottom of the aerating chamber until swung back over the platform 6.

According to modifications not herein described means may be provided for using the excess gas pressure to actuate the return motion of the operating lever 7. Alternatively, the pressure cylinder 28 may be used as a power source for actuating the apparatus and so eliminate the necessity for a user to operate the apparatus manually which would be of considerable merit in the event of the apparatus being used by an aged or infirm person. This feature would be particularly advantageous in the case of apparatus designed to fill ½ or 1 liter bottles.

What we claim is:
1. Apparatus for aerating liquids comprising:
   a. a main body part including a holder for a gas cylinder equipped with a valve;
   b. actuating means on said body part for actuating said valve and for thereby releasing gas from said cylinder;
   c. an aerating head secured to said body for movement between an inserting position in which a vessel can be inserted in said head and an aerating position, an inserted vessel being adjacent said body in said aerating position and remote from said body in said inserting position of the aerating head;
   d. connector means on said aerating head and said holder for connecting the valve of a cylinder held by said holder with a vessel inserted in said aerating head for flow of released gas into said vessel;
   e. a vessel support movably mounted on said body;
   f. cam means on said body part for moving said vessel support toward said inserted vessel in said aerating position and for thereby securing said vessel to said aerating head, and for moving said vessel support away from the inserted vessel and for thereby releasing said vessel from said aerating head; and
   g. safety valve means mounted on said body part and communicating with said connector, said cam means including opening means for opening said safety valve means and for thereby releasing gas from an inserted vessel in response to incipient movement of said vessel support away from said vessel and prior to said releasing of the vessel from said aerating head.

2. Apparatus as claimed in claim 1, wherein said aerating head is swingably connected to said body part.

3. Apparatus as claimed in claim 1, wherein said aerating head is lined with a shield tube receiving the inserted vessel to protect users against injury in the event of said vessel bursting or breaking.

4. Apparatus as claimed in claim 1, wherein said safety valve means includes a carrier and a valve member movable relative to the carrier toward and away from a gas releasing position, and yieldably resilient means biasing said valve member away from said gas releasing position, said yieldably resilient means permitting movement of said valve member toward the gas releasing position in response to a predetermined gas pressure in said connector, said cam means further including means for moving said valve member relative to said carrier during said moving of said vessel support toward said inserted vessel and for thereby preventing jamming of the valve member on said carrier.

5. Apparatus as claimed in claim 4, further comprising a lever manually swingable on said body part and operatively connected to said cam means for operating the same.

6. Apparatus as claimed in claim 4, wherein said connector means include a resilient nozzle on said aerating head for sealing engagement with an inserted vessel secured by said cam means, and a tube extending outward of said aerating head toward said vessel support.

7. Apparatus as claimed in claim 4, wherein said actuating means include a manually operable lever swingably mounted on said body part.

* * * * *